April 5, 1949.   H. WEBER   2,466,343
JETTY
Filed July 15, 1946   2 Sheets-Sheet 1
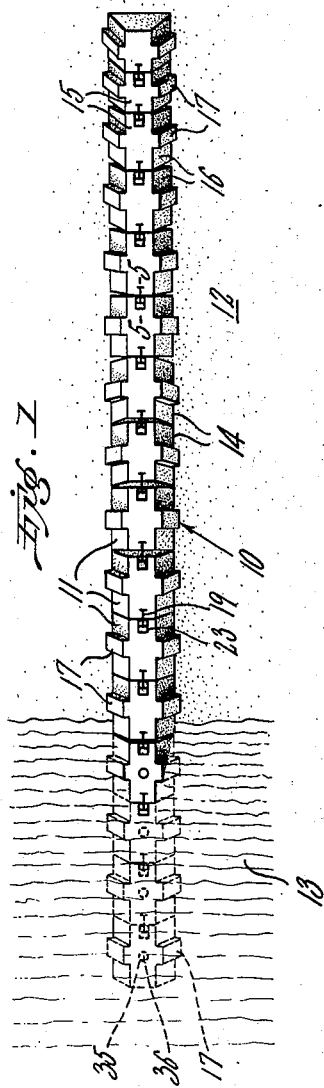
INVENTOR.
HARRISON WEBER
BY
ATTORNEY April 5, 1949.  H. WEBER  2,466,343
JETTY
Filed July 15, 1946  2 Sheets-Sheet 2
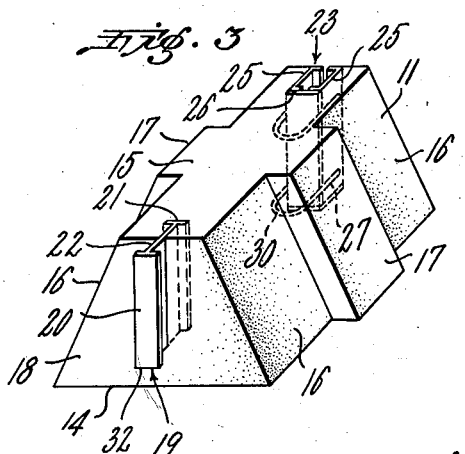
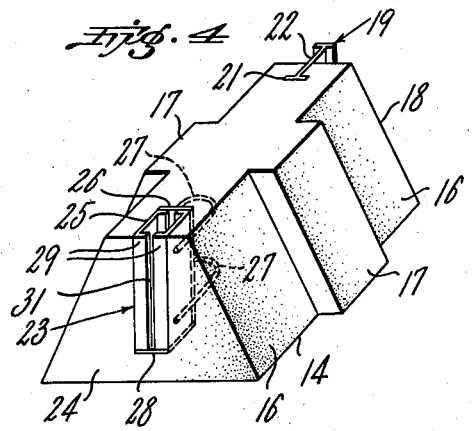
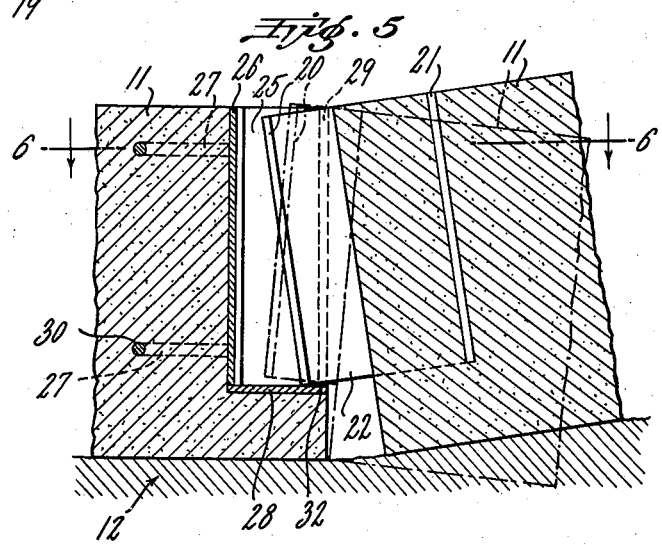
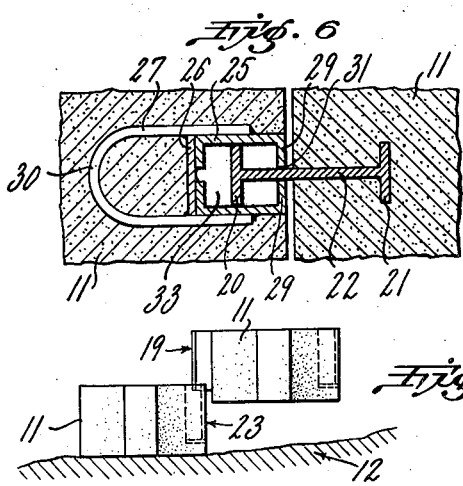
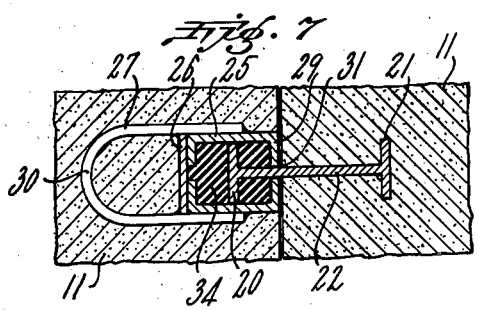
INVENTOR.
HARRISON WEBER
BY
ATTORNEY Patented Apr. 5, 1949

2,466,343

UNITED STATES PATENT OFFICE 2,466,343

JETTY

Harrison Weber, Bellport, N. Y.

Application July 15, 1946, Serial No. 683,725

5 Claims. (Cl. 61—4)

1

This invention relates to the control of erosion along beaches and river banks or the like, and is concerned particularly with an improved multiple block jetty by means of which many advantages are obtained, and the time and labor required for installation considerably reduced.

Water currents resulting from the action of breakers, tides, and other forces have a very destructive effect along the shore line and produce irregularities in the contour of the shore as well as variations in the surface level of the ground. These variations take the form of undulations, depressed spots, embankments, and other unevenness.

Sometimes wave action cuts down the shore producing a step formation. The elimination of surface irregularities adds considerably to the cost of building jetties upon an ocean beach. Furthermore, beaches are constantly changing their form, and this tends to undermine and destroy any structure which cannot adjust itself to the changes.

My object is to provide a jetty construction which can be readily laid upon existing beaches without grading, and which will continue to operate successfully as the beach changes its form. For this purpose articulated blocks are precast with connecting means specifically designed to provide a substantial amount of end play between the individual blocks of the series allowing them considerable freedom to adjust themselves both vertically and angularly with respect to each other and to any changing formation of the ground surface. In this way the blocks automatically adjust themselves to surface changes as they occur, and the entire structure is enabled to obtain a solid footing on the ground. All of the work needed to assemble the complete line of blocks can be accomplished within the time available between low and high water, and there is a saving in the cost of labor. Under circumstances where it is desirable to install the jetty without waiting for low water the blocks may be readily connected together while submerged.

The jetty is adapted for use at any angle out from the shore or as a sea wall along the shore, and as a lining for canals and river banks, etc.

Each of the blocks may be in the form of an inverted V with a flat top and a broad base to provide a good foundation and are precast with connecting means and then transported to the place of use. I have found that the use of buttresses on the slanting sides tends to stabilize the blocks and increase their resistance against the

2 forces set up by waves and currents, and this is another feature of the present improvements.

Further features and advantages of the invention will appear in the following description having reference to the accompanying drawings.

Fig. 1 is a plan view of a jetty installed on a shore according to the invention.

Fig. 2 is a side elevation of the Fig. 1 jetty showing the undulating profile of the shore, with parts in section.

Fig. 3 is a perspective view looking toward one end of the block as used in the jetty.

Fig. 4 is a similar view of the opposite end of the block.

Fig. 5 is a cross-section of the interlocking parts on the line 5-5 of Fig. 1.

Fig. 6 is a cross-section on the line 6-6 of Fig. 5.

Fig. 7 is a similar section showing an elastic filler.

Fig. 8 is a view illustrating the method of assembling the blocks to form a jetty.

In Figs. 1 and 2 of the drawing the numeral 10 indicates a jetty formed of a series of interlocking blocks 11 extending in line upon the undulating surface of the beach 12 and into a body of water 13.

Each of the blocks 11 is preferably of the configuration shown in Figs. 3 and 4 comprising a body of concrete of inverted V-shape and providing a broad base 14 for engaging the surface of the ground, as along a beach or river bank. The top of the block may have a flat face 15. Slanting side walls 16 extend from the base 14 to the top face 15 and have buttresses 17. The end wall 18 is disposed at a right angle to the base 14 and is provided with a vertical headed member 19 which is illustrated as consisting of an I-beam having the opposite flanges or heads 20 and 21 connected together by a web or reduced portion 22. The flange 21 is embedded in the concrete to give secure anchorage while the flange 20 and a portion of the web 22 extend outward from the face of the wall 18 and constitute one of the elements of an interlocking joint.

A vertical channel member 23 is located in the block at the opposite end wall 24 and provides the other element of the joint. The two end walls 18 and 24 extend in parallel vertical relation to each other, and the joint members when operatively engaged permit sufficient tilting of the walls of adjacent blocks to adjust the bases of the blocks to the irregular surface formations of the ground. The channel member 23 may consist of a pair of channel irons 25 faced toward each other and rigidly tied together by a vertical plate 26, to form a channel which is rectangular in transverse cross-section. In order to obtain secure anchorage one or more U-shaped straps 27 may be fastened by their ends to the outer faces of the channel irons 25, and the parts brazed or welded together. A metal plate 28 can be fastened to the bottom of the channel member 23 to give added reinforcement and to act as a stop for the lower end 32 of the headed member 19 when the blocks are being assembled to form the jetty. The parts are embedded in the concrete to bring the flanges 29 of the member 23 flush with the face of the wall 24, and it will be seen that the loops 30 of the straps 27 extend back into the body of the concrete to assure a firm hold.

Attention is directed to Fig. 8 which illustrates the method of connecting the blocks together by their interlocking parts. One of the blocks, which may be considered the first of a series, is shown resting upon the ground while the next block to be added has been elevated. The flange 20 is entered in the channel member 23, and the block is in the act of being lowered to the ground in its interlocked relation to the first block. Any suitable hoisting means may be used for this operation. It will be noted from Fig. 5 that there is a considerable amount of end play between the blocks for adjusting the flange 20 in and out between the inner side faces of the channel irons 25, and that the joint therefore permits considerable tilting of the blocks in the vertical plane of the web 22. Preferably, the width between the inner side faces of the channel irons 25 should not be much greater than the width of the flange 20, there being only enough clearance to give a sliding fit. Likewise, the preferred clearance between the sides of the web 22 and the opposite edges of the slit 31 of the channel member should be small to prevent lateral angular movement of the web in the channel. The thickness of the flange 20 is substantially less than the depth of the channel 33 longitudinally of the block inward from the slit 31. The blocks extend in a line throughout the length of the jetty while the end play of the connections permit the required tilting of the blocks to automatically adjust themselves to the uneven profile of the ground, as will be understood from Figs. 2 and 5. Where steps occur in a beach the blocks can drop to close the gaps and thereby prevent undermining of the structure.

This action is illustrated in Fig. 2a wherein it is noted that block A is resting at an elevation upon the step S, while block B has moved downward into engagement with the ground at G. Block C further down the inclined surface of the beach is resting firmly upon its base at an angle to the block B. The work required to complete the connections is very simple and can be accomplished without skilled labor in a comparatively short period of time. In some installations a filler may be used in the joints. If a filler is used in the space or channel indicated at 33, it may consist of concrete, cement, gravel, sand or other appropriate material, the spaces being filled as the work of assembling the blocks proceeds across the ground, or after the line has been completed. In Fig. 7 there is shown an elastic filler 34 of suitable rubber compound which is adapted to give shock resistance to the joint.

In some localities it may be found desirable to provide positive anchorage for that end of the jetty which extends into the water from the shore line. Such anchorage can be made by providing the blocks with vertical openings 35 for the reception of stakes 36 which are driven deeply into the ground beneath the bases of the blocks. This anchorage may be used for any number or group of the blocks as required.

The line of interconnected heavy blocks forms a substantial wall and is aided by the spaced buttresses to resist the action of waves and currents. Changes may be made in the shape of the blocks and in the details of the interconnected parts without departing from the principles set forth in the above description. Accordingly, the invention may be embodied in various modified forms of construction within the scope of the appended claims.

I claim:

1. A jetty comprising a series of blocks connected together by joints which permit the blocks to adjust themselves with respect to each other, each of said joints including a headed element in the form of a web secured to the end of a block and provided at its outer extremity with a flange, the end of the adjacent block having a vertical channel and a vertical slit in its end wall forming a reduced entrance to the channel, said web extending freely through said slit while the flange is disposed in said channel, said flange being of a width greater than the width of said slit, the thickness of said flange being substantially less than the depth of said channel lengthwise of the block inward from said slit, the walls of said channel being shaped to allow free movement of said flange toward and away from said slit and angularly and vertically in said channel.

2. A jetty comprising a series of blocks connected together by joints which permit the blocks to adjust themselves with respect to each other, each of said joints including a headed element in the form of a web secured to the end of a block and provided at its outer extremity with a flange, the end of the adjacent block having a vertical channel and a vertical slit in its end wall forming a reduced entrance to the channel, said web extending through said slit and disposing the flange in said channel, said flange being of a width greater than the width of said slit, there being a sliding fit between said web and the sides of said slit, said channel being rectangular in transverse cross-section, the thickness of said flange being substantially less than the depth of said channel lengthwise of the block inward from said slit, the outer ends of said flange having a sliding fit between the side walls of the rectangular channel, said flange being permitted substantial movement toward and away from said slit.

3. A jetty comprising a series of blocks connected together by joints which permit the blocks to adjust themselves with respect to each other, each of said joints including a headed element in the form of a web secured to the end of a block and provided at its outer extremity with a flange, the end of the adjacent block having a vertical channel and a vertical slit in its end wall forming a reduced entrance to the channel, said web extending freely through said slit and disposing the flange in said channel, said flange being of a width greater than the width of said slit, the thickness of said flange being substantially less than the depth of said channel lengthwise of the block inward from said slit, said flange being allowed to move toward and away from said slit throughout the depth and height of said channel and angularly therein, and a stop at the lower portion of said channel for engagement by said headed element.

4. A jetty comprising a series of blocks connected together by joints which permit the blocks to adjust themselves with respect to each other, each of said joints including a headed element in the form of a web secured to the end of a block and provided at its outer extremity with a flange, the end of the adjacent block having a vertical channel and a vertical slit in its end wall forming a reduced entrance to the channel, said web extending through said slit and disposing the flange in said channel, said flange being of a width greater than the width of said slit, the thickness of said flange being substantially less than the depth of said channel lengthwise of the block inward from said slit, said channel being of uniform width throughout its depth and providing a sliding fit for the outer ends of said flange, said blocks being of inverted V-shape providing broad bases below the plane of the joints.

5. A jetty comprising a series of blocks connected together by joints which permit the blocks to adjust themselves with respect to each other, each of said joints including a headed element in the form of a web secured to the end of a block and provided at its outer extremity with a flange, the end of the adjacent block having a vertical channel and a vertical slit in its end wall forming a reduced entrance to the channel, said web extending through said slit and disposing the flange in said channel, said flange being of a width greater than the width of said slit, the thickness of said flange being substantially less than the depth of said channel lengthwise of the block inward from said slit, said flange being movable toward and away from said slit throughout the depth of said channel, said blocks being of inverted V-shape providing broad bases below the plane of the blocks, said jetty being provided with buttresses along its side walls.

HARRISON WEBER.

REFERENCES CITED

The following references are of record in the file of this patent:

UNITED STATES PATENTS

| Number | Name | Date |
| --- | --- | --- |
| 954,283 | Hawkes | Apr. 5, 1910 |
| 1,662,578 | Kellner | Mar. 13, 1928 |
| 1,812,300 | Leeds | June 30, 1931 |
| 1,893,003 | Schlueter | Jan. 3, 1933 |
| 2,192,509 | Simpson | Mar. 5, 1940 |

FOREIGN PATENTS

| Number | Country | Date |
| --- | --- | --- |
| 185,081 | Great Britain | 1923 |
| 364,218 | Italy | 1938 |